Aug. 7, 1973    IWAO KANNO ET AL    3,751,559
PROCESS FOR TREATING AN AQUEOUS SOLUTION OF CRUDE SODIUM CHLORIDE
Filed June 16, 1971    2 Sheets-Sheet 1
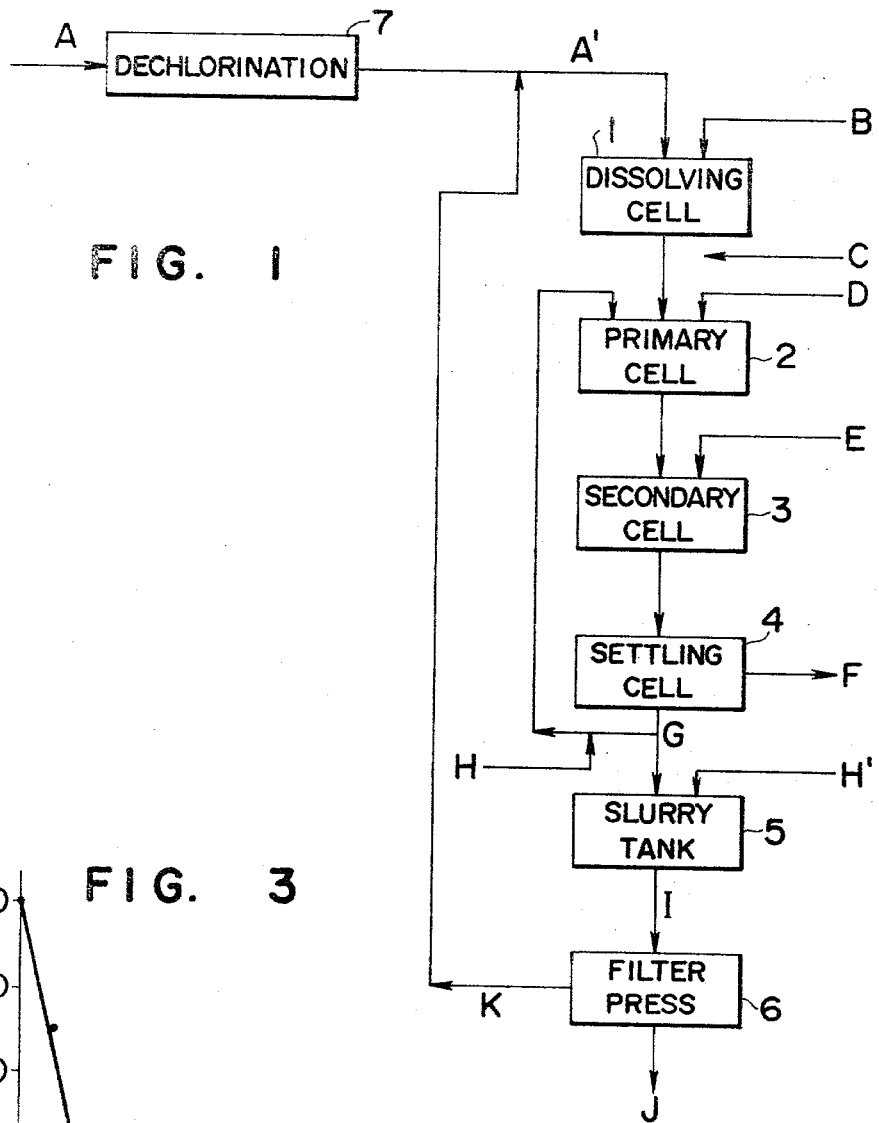
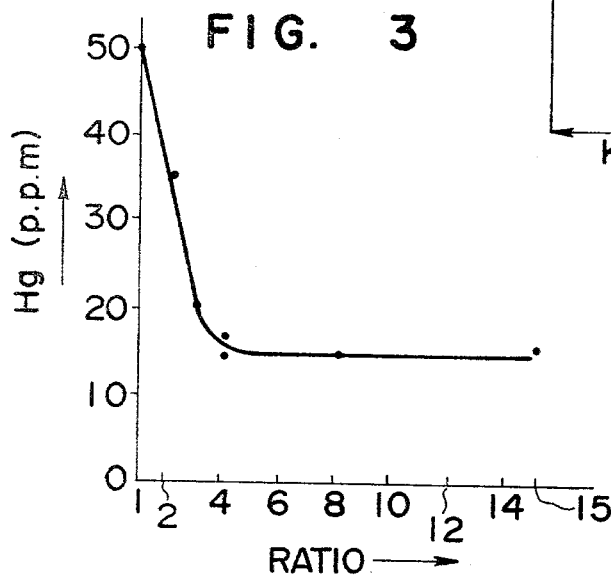
INVENTORS
IWAO KANNO
JUNICHI YOSHIOKA
SUMITO FUZIO
BY Cushman, Darby & Cushman
ATTORNEYS ered Aug. 7, 1973

3,751,559
PROCESS FOR TREATING AN AQUEOUS SOLUTION OF CRUDE SODIUM CHLORIDE

Iwao Kanno, Junichi Yoshioka, and Sumito Fuzio, Miyazaki, Japan, assignors to Asahi Kasei Kogyo Kabushiki Kaisha, Osaka, Japan
Filed June 16, 1971, Ser. No. 153,776
Int. Cl. C01d 3/16
U.S. Cl. 423—158        7 Claims

ABSTRACT OF THE DISCLOSURE

A process for treating an aqueous solution of crude sodium chloride containing mercury wherein, before removing magnesium and calcium which contaminate the crude sodium chloride, chlorine or sodium hypochlorite is added to said solution to control concentration of free chlorine therein to at least 10 mg./l., thereby to prevent mercury from precipitating with magnesium and calcium. It is preferable to recycle a slurry containing precipitates of calcium and magnesium.

---

Figure 2:
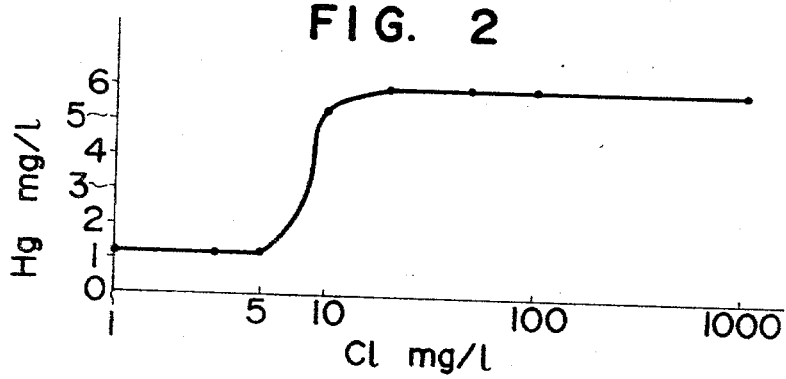

This invention relates to a process for purifying an aqueous solution of crude sodium chloride. More particularly, the invention relates to an improvement in a process for purifying an aqueous solution of crude sodium chloride containing mercury.

In the industry of producing sodium hydroxide by electrolysis of an aqueous sodium chloride solution using a mercury electrode, many attempts have been made to recover mercury from a dilute aqueous solution of sodium chloride discharged from an electrolytic cell. The aqueous solution usually contains 3 to 10 mg./l. of mercury, sometimes as high as 100 mg./l. or more immediately after starting of the electrolysis, and 50 to 300 mg./l. of dissolved chlorine. The aqueous solution is subjected to a dechlorination treatment until the amount of the dissolved chlorine reaches about 5 mg./l. Furthermore, caustic alkali is added thereto to adjust pH to 6 to 8 before raw salt is dissolved in the aqueous solution. Caustic alkali and alkali carbonate are added to the aqueous solution of crude sodium chloride in order to precipitate and remove magnesium and calcium, respectively. Thus purified solution is fed to electrolysis. Mercury is coprecipitated with said precipitates of magnesium and calcium and thus it is lost. Generally, this loss of mercury amounts to 0.05 to 0.10 kg. per ton of sodium hydroxide. However, complicated apparatus and operation are required to recover mercury from the precipitate. Mercury dissolved in an overflow from the electrolytic cell is in the form of $HgCl_2$ which is produced by attacking metallic mercury in the cell with the dissolved chlorine in the dilute aqueous sodium chloride solution. It is considered that the $HgCl_2$ equilibrates with NaCl present in a large amount to produce a complex salt in accordance with the following equation:

$$HgCl_2 + 2NaCl \rightleftharpoons Na_2(HgCl_4)$$

This complex salt is unstable. Therefore, when an amount of chlorine in the aqueous solution is small, e.g., about 5 mg./l. as mentioned above, said complex salt reacts with caustic alkali and alkali carbonate to produce sparingly soluble mercury oxide and mercury carbonate. These are adsorbed on magnesium hydroxide and calcium carbonate to precipitate.

The present inventors have found that in the above case, the presence of at least 10 mg./l. of chlorine as free chlorine in the aqueous sodium chloride solution can control the formation of the mercury oxide and mercury carbonate to reduce an amount of mercury to be lost in said precipitates.

This invention provides a process for reducing the amount of mercury lost as copreciptate as much as possible.

According to this invention, a modification is made to the step of dissolving raw salt material. That is, chlorine or hypochlorite is added to the aqueous solution of crude sodium chloride, prior to precipitation of said magnesium and calcium, to control concentration of free chlorine contained in said aqueous solution to at least 10 mg./l.

Furthermore, according to this invention, a part of slurry which contains and precipitates is recycled to the step of removing magnesium and calcium. At that time, it is preferred that the slurry is prepared to have 10 mg./l. or more of free chlorine by adding thereto chlorine or hypochlorite. By this procedure, recovery of mercury which is still lost in said precipitates is further improved.

Moreover, according to this invention, chlorine or hypochlorite is added to the slurry not recycled until an amount of free chlorine is at least 10 mg./l. as mentioned above to enhance solubilization of mercury contained in the slurry. The solution thus obtained is used for dissolving raw salt material.

(I) RAW MATERIAL (A) Mercury-containing material.—The most available commercial source is an overflow obtained from said electrolysis of sodium chloride. However, other sources may also be employed.

(B) Raw salt material.—Rock salt is the commercial material.

(C) Caustic alkali and alkali metal carbonate.—Hydroxides of alkali metal such as NaOH and carbonates of alkali metal such as $Na_2(CO_3)$.

(D) Chlorine-containing material.—Chlorine is used as it is. In place of the chlorine, alkali metal hydrochlorite such as sodium hypochlorite may be used.

This is because chlorine added to the crude sodium chloride solution reacts with sodium hydroxide added in the purification step to produce sodium hypochlorite. The alkali metal is preferably the same as that in the above (C).

An overflow from electrolytic cell as referred to in (A) may also be used because it still contains free chlorine.

(II) PROCESS

The present process will be explained below as to the case which uses an aqueous solution of sodium chloride containing mercury discharged from a cell for sodium chloride electrolysis.

A raw salt material, e.g., rock salt, is dissolved with said aqueous solution of sodium chloride. The resulting solution is referred to as a crude aqueous sodium chloride solution. In this invention, the amount of free chlorine in the resulting solution is controlled to at least 10 mg./l. Since chlorine is corrosive, the transportation means is damaged during transportation of said aqueous solution of sodium chloride. Therefore, it is commercially preferable to dechlorinate said aqueous solution immediately after having been discharged from the electrolytic cell to an extent of about 5 mg./l. or less as in the conventional procedure. In case of using thus once dechlorinated aqueous solution for the dissolving of the raw salt material, chlorine-containing material is added to the resulting solution in such a manner that the concentration of free chlorine reaches 10 mg./l. or more. Of course, said chlorine-containing material may be added to the aqueous solution before the raw salt material is dissolved therein. Furthermore, the amount of free chlorine in the aqueous solution may be controlled at said dechlorination treatment without adding the chlorine-containing material. However, as mentioned before, it is preferable to control the amount of free chlorine after the raw salt material has been dissolved in the aqueous solution because of the corrosive action of chlorine.

To thus prepared crude sodium chloride solution are added caustic alkali and alkali carbonate in an amount sufficient to precipitate magnesium and calcium contained in the crude sodium chloride solution, respectively. Caustic alkali and alkali carbonate may be added in the sequence of firstly caustic alkali and then alkali carbonate. Alternatively, they may be added simultaneously.

A slurry is produced at the formation of precipitate containing magnesium and calcium. Said slurry accompanies mercury, but the amount thereof is smaller than that contained in the slurry of the conventional process. Therefore, in order to effectively recover said accompanied mercury, said slurry is recycled to the step of precipitating magnesium and calcium. Preferably, in said recycling step, another chlorine-containing material is added to the slurry to control the concentration of free chlorine in said slurry to 10 mg./l. or more.

Said recycling can be effected at a recycling ratio of 2 to 15. The term "recycling ratio" means the ratio, $$\frac{\text{Total amount of magnesium and calcium per 1 l. of an aqueous sodium chloride solution to which only caustic alkali has been added}}{\text{Total amount of magnesium and calcium per 1 l. of an aqueous solution of crude sodium chloride}}$$

The numerator of the above ratio may be a total amount of magnesium and calcium per 1 l. of an aqueous sodium chloride solution to which both caustic alkali and alkali carbonate have been added but before settling of magnesium and calcum is initiated.

The greater part of the slurry containing magnesium and calcium is recycled as mentioned above, but the remainder is transferred to a slurry receiving cell. The latter slurry still contains a small amount of mercury. A chlorine-containing material is added to this slurry in such a manner that the concentration of free chlorine reaches 10 mg./l. or more per 1 l. of the slurry, thereby to dissolve out mercury. Thus treated slurry is filtered with filter press. The resultant filtrate containing mercury is used for dissolving rock salt. The cake is wasted.

In the accompanying drawings:

FIG. 1 is a flow diagram illustrating one of embodiments of the process of the invention, wherein:

1 is a dissolving cell for rock salt to prepare a crude aqueous sodium chloride solution,
2 is a primary reaction cell,
3 is a secondary reaction cell,
4 is a settling cell for magnesium- and calcium-containing precipitate,
5 is a slurry tank,
6 is a filter press,
7 is a dechlorination apparatus,
A is an overflow from an electrolytic cell,
A' is a dechlorinated overflow,
B is, for example, rock salt,
C is a chlorine-containing material such as chlorine or hypochlorite,
D is sodium hydroxide, with which magnesium is precipitate as $Mg(OH)_2$,
E is sodium carbonate, with which calcium is precipitated as $CaCO_3$,
F is a purified aqueous sodium chloride solution, which is fed to the electrolytic cell,
G is precipitated slurry, H and H' are chlorine-containing material,
I is slurry,
J is cake, and
K is a filtrate, which is recycled to A'.

FIG. 2 is a graph showing relation between the amount (mg./l.) of chlorine dissolved in a crude aqueous sodium chloride solution and the amount of mercury in the purified aqueous solution. The latter amount was obtained as follows: Chlorine was added to an aqueous solution of crude sodium chloride solution containing 65 mg./l. of $Mg^{++}$, 205 mg./l. of $Ca^{++}$, 6 mg./l. of Hg and 310 g./l. of NaCl. To the resultant solution were added sodium hydroxide and sodium carbonate in amounts necessary to precipitate $Mg^{++}$ and $Ca^{++}$ as magnesium hydroxide and calcium carbonate, respectively. After removal of these precipitates, the amount of mercury remaining in the purified aqueous sodium chloride solution was measured.

It will be recognized from the graph that presence of 10 mg./l. of free chlorine causes conspicuous increase of the amount of mercury in the purified aqueous solution, namely, decrease of the amount of mercury lost in the precipitates of magnesium and calcium.

Figure 4:
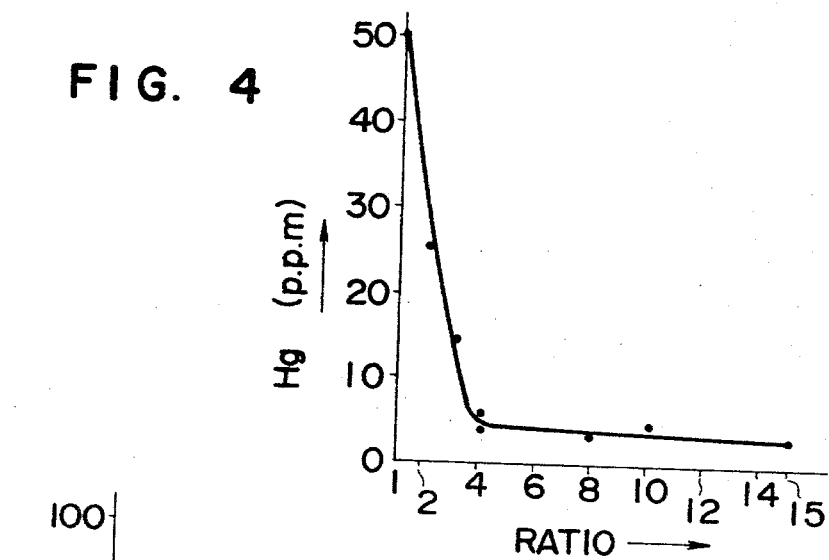

FIGS. 3 and 4 show the relations between the recycling ratio and content of mercury in the cake. FIG. 3 indicates the relation in case of adding no chlorine containing material to the recycling slurry and FIG. 4 shows that in case of adding said material. These figures show the relations obtained when 30 mg./l. of free chlorine was added to a crude sodium chloride solution containing 60 to 75 mg./l. of $Mg^{++}$, 200 to 220 mg./l. of $Ca^{++}$, 5 to 6 mg./l. of Hg and 305 to 310 g./l. of NaCl at a flow rate of 150 m.³/hr. at a temperature of 63 to 65° C. in the steps shown in FIG. 1 to effect continuous purification of said solution while being discharged from the lower part of a settling tank. From these figures, it is seen that, when the recycling ratio is 2 to 15, the content of mercury in the cake is extremely reduced, namely, the amount of mercury lost is decreased as compared with the case when the recycling ratio is 1 (no recycling is carried out). Furthermore, it is also recognized that said effect can be more extremely increased when a chlorine-containing material is added to the recycling slurry.

Figure 5:
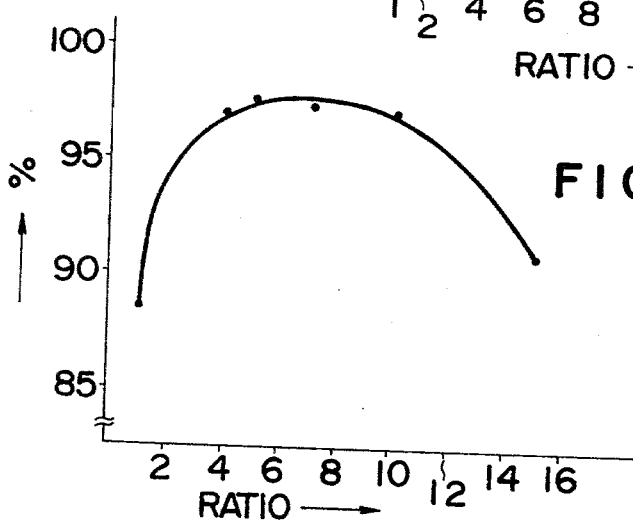

FIG. 5 shows the relation between the recycling ratio and removing rates of magnesium and calcium under the same conditions as in FIGS. 3 and 4. The term "removing rate" means the ratio:

$$\frac{\text{Amount of magnesium} + \text{calcium present as contaminants in purified solution (1 l.)}}{\text{Total amount of magnesium} + \text{calcium in crude solution (1 l.)}}$$

From FIG. 5, it can be recognized that the recycling ratio is preferably 4 to 9.

The advantage attained by this invention will be clearly seen from the above descriptions and the drawings.

The process of this invention is illustrated more particularly by way of the following examples.

EXAMPLE 1

To 150 m.$^3$/hr. of a crude aqueous sodium chloride solution containing 61 mg./l. of Mg, 220 mg./l. of Ca, 5 mg./l. of Hg and 305 g./l. of NaCl and having a specific gravity of 1.210/15° C. were added sodium hydroxide and sodium carbonate in sufficient amounts to precipitate magnesium and calcium ions in said crude aqueous solution as magnesium hydroxide and calcium carbonate, respectively, thereby to continuously purify the salt solution at a pH of 10.3 to 10.7. Fifty mg./l. of chlorine was allowed to be contained in said crude aqueous solution at the step mentioned above. As the result, 5 mg./l. of Hg remained in the supernatant purified solution discharged from a settling tank.

On the other hand, the precipitated slurry which was discharged from the lower part of the settling tank and which contained 27.5 g./l. of $Mg(OH)_2$, 100 g./l. of $CaCO_3$ and 295 g./l. of NaCl and had a specific gravity of 1.215/15° C. contained 5 mg./l. of Hg. The cake obtained by filtering said slurry with a filter press had the following compositions: Solid matter 68.5%, water and volatile matter 31.4% and content of Hg 29.3 p.p.m.

EXAMPLE 2

Sodium hydroxide and sodium carbonate were added to 200 m.$^3$/hr. of a crude aqueous sodium chloride solution containing 72 mg./l. of Mg, 195 mg/l. of Ca, 7 mg./l. of Hg and 307 g./l. of NaCl and having a specific gravity of 1.210/15° C. to continuously purify said solution at a pH of 10.3 to 10.7. Hypochlorite was added to the crude solution at the step mentioned above in such a manner that the amount of free chlorine in said crude solution reached 20 mg./l. The amount of Hg remaining in the purified solution was 6.95 mg./l.

On the other hand, the precipitated slurry which was discharged from a settling tank and which contained 26.5 g./l. of $Mg(OH)_2$, 88.7 g./l. of $CaCO_3$ and 296 g./l. of NaCl and had a specific gravity of 1.215/15° C. contained 10 mg./l. of Hg. The cake obtained by filtering said slurry with a filter press had the following compositions: Solid matter 70.2%, water and volatile matter 29.8% and content of Hg 58 p.p.m.

EXAMPLE 3

To 150 m.$^3$/hr. of a crude aqueous sodium chloride solution containing 70 mg./l. of Mg, 210 mg./l. of Ca, 5 mg./l. of Hg and 305 g./l. of NaCl and having a specific gravity of 1.210/15° C. were added sodium hydroxide and sodium carbonate in amounts enough to precipitate magnesium and calcium ions in said crude solution as magnesium hydroxide and calcium carbonate, respectively, thereby to continuously purify said solution at a pH of 10.3 to 10.7. In said crude solution, 20 mg./l. of chlorine was allowed to be contained. The precipitated slurry which was discharged from the lower part of a settling tank and which contained 27 g./l. of $Mg(OH)_2$, 84 g./l. of $CaCO_3$ and 295 g./l. of NaCl and had a specific gravity of 1.215/15° C. was continuously recycled to the crude solution at 5 m.$^3$/hr. and at a recycling ratio of 6.35. As the result, 5 mg./l. of Hg remained in the supernatant purified salt solution discharged from the settling tank.

On the other hand, said precipitated slurry discharged from the settling tank contained 5 mg./l. of Hg. The cake obtained by filtering said slurry with a filter press had the following compositions: Solid matter 64.2%, water and volatile matter 35.7% and content of Hg 15.3 p.p.m.

EXAMPLE 4

Example 3 was repeated, except that a part of the precipitated slurry discharged from the lower part of settling tank was introduced into a precipitated slurry receiving cell. Twenty mg./l. of chlorine per 1 l. of the precipitated slurry was added to the slurry. The precipitated slurry after being well stirred contained 5 mg./l. of Hg. The cake obtained by filtering said slurry with a filter press had the following compositions: Solid matter 65.8%, water and volatile matter 34.1% and Hg content 6.3 p.p.m.

EXAMPLE 5

To 150 m.$^3$/hr. of a crude aqueous sodium chloride solution containing 65 mg./l. of Mg, 220 mg./l. of Ca, 5 mg./l. of Hg and 310 g./l. of NaCl and having a specific gravity of 1.212/15° C. were added sodium hydroxide and sodium carbonate in amounts enough to precipitate magnesium and calcium ions in said crude salt solution as magnesium hydroxide and calcium carbonate, respectively, thereby to continuously purify the solution at a pH of 10.3 to 10.7. Sodium hypochlorite was added to said crude solution at the step mentioned above in such a manner that the amount of free chlorine in said crude solution reached 10 mg./l.

The precipitated slurry which was discharged from the lower part of settling tank and which contained 26.5 g./l. of $Mg(OH)_2$, 93.5 g./l. of $CaCO_3$ and 297 g./l. of NaCl and had a specific gravity of 1.215/15° C. was continuously recycled to the crude solution at 8 m.$^3$/hr. and a recycling ratio of 10.1. As the result, 5 mg./l. of Hg remained in the purified solution.

On the other hand, said precipitated slurry discharged from the lower part of the settling tank contained 5 mg./l. of Hg. The cake obtained by filtering said slurry with a filter press had the following compositions: Solid matter 63.8%, water and volatile matter 36.2% and Hg content 16.1 p.p.m.

EXAMPLE 6

Example 5 was repeated except that a part of the precipitated slurry discharged from the lower part of the settling tank was introduced into a precipitated slurry receiving cell, to which sodium hypochlorite was added in such a manner that the amount of free chlorine reached 10 mg. per 1 l. of the precipitated slurry. After being well stirred, said precipitated slurry contained 5 mg./l. of Hg. The cake obtained by filtering said slurry had the following compositions: Solid matter 67.5%, water and volatile matter 32.4% and Hg content 5.2 p.p.m.

What is claimed is:

1. In a process for treating a crude aqueous solution of sodium chloride containing mercury by adding alkali metal hydroxide and alkali metal carbonate to said solution to precipitate magnesium and calcium ions contained in said solution as magnesium hydroxide and calcium carbonate respectively, thereby to purify said solution, the improvement comprising controlling the concentration of free chlorine in said solution at the time of precipitation to at least 10 mg./l. and thereby preventing the precipitation of mercury.

2. A process according to claim 1, wherein said crude aqueous sodium chloride solution containing mercury is that obtained by dissolving a crude sodium-containing material with an overflow containing mercury discharged from sodium chloride electrolysis step.

3. A process according to claim 1, wherein the concentration of free chlorine is controlled by adding chlorine or an alkali metal hypochlorite to said aqueous solution.

4. A process according to claim 1 wherein the product formed is allowed to settle into a supernatant salt solution and a lower slurry containing precipitates mainly composed of calcium and magnesium compounds, the supernatant solution is removed, a portion of the precipitate is removed and the remaining slurry still containing mercury, is recycled to the crude solution to recover the mercury therefrom.

5. A process according to claim 4, wherein the recycling ratio defined below is 2 to 15

$$\text{Recycling ratio} = \frac{\text{Total amount of magnesium and calcium per 1 l. of sodium chloride solution to which caustic alkali has been added}}{\text{Total amount of magnesium and calcium per 1 l. of a crude aqueous sodium chloride solution}}$$

6. A process according to claim 5, wherein chlorine or an alkali metal hypochlorite is added to the recycled slurry to control the concentration of free chlorine in 1 l. of the slurry to at least 10 mg./l.

7. A process according to claim 4, wherein chlorine or an alkali metal hypochlorite is added to slurry which is not recycled to control the concentration of free chlorine therein to 10 mg./l. and filtrate is used for dissolving raw salt material.

References Cited
UNITED STATES PATENTS

| | | | |
|---|---|---|---|
| 1,861,763 | 6/1932 | Terziev | 23—42 |
| 2,793,099 | 5/1957 | Clarke | 23—89 |
| 3,085,859 | 4/1963 | Scholten et al. | 75—101 BE |
| 3,115,389 | 12/1963 | Deriaz | 23—89 |
| 3,424,552 | 1/1969 | Cadmus | 23—87 X |
| 3,442,778 | 5/1969 | Westerlund | 23—152 X |

FOREIGN PATENTS

| | | | |
|---|---|---|---|
| 13,127 | 1905 | Great Britain | 23—42 |

EDWARD STERN, Primary Examiner

U.S. Cl. X.R.

423—99, 164, 165, 499